(12) United States Patent
Shanbhag

(10) Patent No.: US 6,314,125 B1
(45) Date of Patent: Nov. 6, 2001

(54) METHOD AND APPARATUS FOR THE CONSTRUCTION AND TRANSMISSION OF BINARY QUASI ORTHOGONAL VECTORS

(75) Inventor: Abhijit G. Shanbhag, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/208,336

(22) Filed: Dec. 9, 1998

(51) Int. Cl.[7] ............................................. H04K 1/00
(52) U.S. Cl. ........................... 375/130; 375/140; 370/208
(58) Field of Search ................... 375/130, 139, 375/140, 141, 146; 370/208, 209, 335; 341/50

(56) References Cited

U.S. PATENT DOCUMENTS

| | | | |
|---|---|---|---|
| 4,685,132 | * 8/1987 | Bishop et al. | 380/46 |
| 5,101,501 | 3/1992 | Gilhousen et al. | 455/33 |
| 5,136,611 | 8/1992 | Kirimoto et al. | 375/1 |
| 5,463,657 | 10/1995 | Rice | 375/200 |
| 5,535,239 | 7/1996 | Padovani et al. | 375/205 |
| 5,606,322 | 2/1997 | Allen et al. | 341/173 |
| 6,091,760 | * 7/2000 | Giallorenzi et al. | 375/140 |

FOREIGN PATENT DOCUMENTS

| | | |
|---|---|---|
| 9605668 | 2/1996 | (WO) . |
| 0011825 | 3/2000 | (WO) . |
| 0014916 | 3/2000 | (WO) . |
| WO 00/19730 | * 4/2000 | (WO) . |

OTHER PUBLICATIONS

Boztas, et al. "4–Phase Sequences with Near–Optimum Correlation Properties" IEEE Transactions on Information Theory 38(3): 1101–1113 (May 1992).

Golomb, Solomon. *Shift Register Sequences*, Aegean Park Press, Chapter 4, pp. 75–89 (1967).

McDonald, Bernard R. *Finite Rings with Identity*, Marcel Dekker, Inc., Chapter 13, pp. 251–276 (1974).

* cited by examiner

*Primary Examiner*—Stephen Chin
*Assistant Examiner*—Chieh M. Fan
(74) *Attorney, Agent, or Firm*—Philip Wadsworth; Kent D. Baker; Byron Yafuso

(57) ABSTRACT

A transmission method in a communications system has an orthogonal code vector for transmitting message signals. A first vector matrix is formed using a first series of cyclic shifts of a sequence having a characteristic polynomial wherein the characteristic polynomial of the sequence is a primitive polynomial having a degree r. A second vector matrix is formed using a second series of cyclic shifts in accordance with whether r is odd or even. The first vector matrix is permuted to provide an orthogonal code. The permuting operations are determined. The determined permuting operations are applied to the second matrix to provide a binary quasi orthogonal code vector. The binary quasi orthogonal code vector is applied to a message signal to provide an encoded message signal for transmission in the communications system. The transmission method also includes forming a vector matrix using a series of cyclic shifts of a sequence having a characteristic polynomial. The characteristic polynomial of the sequence is a primitive polynomial having a degree r. The method further includes permuting the vector matrix to form an orthogonal code to thereby provide a permutation matrix. The permutation matrix is applied to a message signal to provide an encoded message signal and the encoded message signal is transmitted in the communications system.

20 Claims, 8 Drawing Sheets

METHOD AND APPARATUS FOR THE CONSTRUCTION AND TRANSMISSION OF BINARY QUASI ORTHOGONAL VECTORS

BACKGROUND OF THE INVENTION

I. Field of the Invention

This invention relates to the field of communications systems and, in particular, to the field of transmission of spread coded message signals within communications systems.

II. Description of the Prior Art

It is well known in the art of communications to mix message signals to be transmitted with spreading code vectors. The use of spreading code vectors permits the message signals to be combined, transmitted, and separated from each other after transmission. The most useful feature of a set of code vectors suitable for this purpose is that the spreading code vectors are mutually orthogonal. This permits a theoretical interference of zero between the message signals. The code vectors most commonly used for this purpose are Walsh code vectors.

The total number of binary code vectors having a length n is $2^n$. However, of the total number of binary vectors $2^n$ within the total vector space, only n are mutually orthogonal. For example, when n=8 there are 256 different binary vectors. Only 8 of the 256 vectors are mutually orthogonal. Therefore, in a system wherein n=8 usually only 8 message signals can be combined and separated in this manner and only 8 users can be supported simultaneously. Likewise, if n=128 then 128 users can be supported simultaneously. Some of the vectors can be idle some of the time, thereby permitting more than n users to be serviced. However, the size of the code vectors still places a limitation on the size of the communications system.

A set W of code vectors w meeting the orthogonality requirement for a theoretical interference of zero can be represented as follows:

$$w_1 = [w_{1,1} w_{1,2} \ldots w_{1,n}]$$
$$w_2 = [w_{2,1} w_{2,2} \ldots w_{2,n}]$$
$$\vdots$$
$$w_n = [w_{n,1} w_{n,2} \ldots w_{n,n}]$$

wherein each vector $w_i$ is a column vector using a 0/1 alphabet or, equivalently, a −1/+1 alphabet. Hereinbelow, a set of code vectors using the 0/1 alphabet is expressed as $W_{b,n}$ and a set using the −1/+1 alphabet is expressed as $W_n$.

Since all vectors w in the set W are orthogonal to each other, the dot product of any two vectors in the set must be zero. This can be represented as:

$$(w_x, w_y) = 0$$

where x and y can have any values between 1 and n, x≠y and $(w_x, w_y)$ is equal to:

$$\sum_{i=1}^{n} w_{x,i} w_{y,i}.$$

Equivalently, the above can be expressed as the following matrix product:

$$w_x^T w_y = 0.$$

Also:

$$w_x^T w_x = n.$$

In a mobile radio telephone communication system that uses spreading code vectors for transmission of message signals, where the with data symbol to be transmitted is represented as $d_i$ and the total number of transmit signals as k, the total transmission signal S transmitted by a base station to a mobile station is:

$$S = \sum_{i=1}^{k} d_i w_i$$

The mobile station receives the total transmission signal S and tries to eliminate all message signals except its own.

In order to eliminate the other messages the mobile station can multiply signal S by the transpose of its own Walsh code vector. An example wherein i=1 is as follows:

$$w_1^T S = w_1^T \sum_{i=1}^{k} d_i w_i$$
$$= w_1^T \left( d_1 w_1 + \sum_{i=2}^{n} d_i w_i \right)$$

wherein the first term on the right side represents the wanted signal. The second term in the right side represents the interference from all of the remaining message signals mixed with their individual Walsh codes. Solving this equation yields:

$$w_1^T S = n d_1 + 0.$$

Thus, the separation of the transmitted message signals at the receiver depends on a zero correlation between the wanted signal and all of the other message signals.

In order to utilize communications systems as effectively as possible it is desirable to simultaneously transmit and separate as many message signals as possible. However, it is only possible to mix n message signals and separate them with zero interference because only n orthogonal vectors are available, as previously described. To overcome this limitation it is known to use quasi orthogonal functions. Quasi orthogonal vectors are vectors that are in addition to the n orthogonal vectors. Quasi orthogonal vectors have been selected from the remaining code vectors in the total binary $2^n$ vector space in order to provide as little interference as possible. Specifically, quasi orthogonal vectors are selected to provide a level of interference that is within acceptable limits, even though the level of interference is not zero.

In order to select quasi orthogonal vectors a computer search can be performed within the total $2^n$ vector space for binary (+1/−1 alphabet) masks. The masks can be applied to the orthogonal vectors to form a new set of vectors that are quasi orthogonal vectors. Applying a total of M masks to a set of Walsh code vectors $w_n$, the number of quasi orthogonal functions produced is: (M+1)n. Applying a mask m to a code vector w∈$W_n$ includes a component by component multiplication of the mask m and the orthogonal code vector w to give the new code vector:

$$w_m = w \cdot m$$

The interference resulting from the use of the new code vectors can be tested and the code vectors that provide the lowest correlation can be selected to provide a set of quasi orthogonal vectors. A plurality of such masking functions can be found in order to provide a plurality of sets of quasi orthogonal vectors from a single set of orthogonal vectors. In order to permit message signals mixed with the quasi orthogonal vectors found by the computer search to be separated from each other, the quasi orthogonal vectors should be mutually orthogonal with respect to each other. There is a non-zero correlation between at least one code vector in the orthogonal set and one vector in the quasi orthogonal set.

Representing the quasi orthogonal vectors as v it can be shown that:

$$\frac{1}{n}\sum_{j+1}^{n}((v, w_j)^2) = \frac{1}{n}$$

The goal in picking quasi orthogonal vectors v is to pick the vectors such that $$\max_{1 \le i \le n}\{|(\underline{v}, \underline{w}_i)|\}$$

is as small as possible.

Since their correlation is a useful measure of the amount of separation between vectors, the normalized correlation between two code vectors x and y can be defined as:

$$(x, y) = \frac{1}{n}\sum_{i=1}^{n}x_1 y_1^*$$

The correlation between two orthogonal vectors is zero. A lower absolute value of correlation results in better separation between message signals mixed with the orthogonal vectors and the ones mixed with quasi orthogonal vectors. Better signal separation results in lower interference between the signals at the time of decoding.

The mean square correlation between orthogonal vectors and their corresponding quasi orthogonal vectors where n is a power of two is 1/n. The lower bound on the absolute value of correlation can be shown to have the value, $1/\sqrt{n}$. This quantity is referred to as the Holtzman lower bound. Masks have been found that meet the lower bound for cases wherein n is an even power of two. However, in cases where n is an odd power of two this bound has not been met with an equality. The lowest correlation found in the latter case is $\sqrt{2}/\sqrt{n}$. Therefore, the interference of the best quasi orthogonal vectors found in the odd power of two case using the computer search technique is $\sqrt{2}$ times the theoretical limit. Furthermore, with respect to any two sets of quasi orthogonal functions there is some non zero correlation between one pair of code vectors. The correlation between a pair of quasi orthogonal function sets is defined as the maximum absolute correlation between two such code vectors belonging to the two sets.

Thus it desirable to find additional quasi orthogonal vectors having lower correlation with the orthogonal vectors for the case wherein n is an odd power of two, in order to expand the capacity of communications systems while maintaining acceptably low amounts of interference.

SUMMARY OF THE INVENTION

A transmission method in a communications system has an orthogonal code vector for transmitting message signals. A first vector matrix is formed using a first series of cyclic shifts of a sequence having a characteristic polynomial wherein the characteristic polynomial of the sequence is a primitive polynomial having a degree r. A second vector matrix is formed using a second series of cyclic shifts in accordance with whether r is odd or even. The first vector matrix is permuted to provide an orthogonal code. The permuting operations are determined. The determined permuting operations are applied to the second matrix to provide a binary quasi orthogonal code vector. The binary quasi orthogonal code vector is applied to a message signal to provide an encoded message signal for transmission in the communications system. The binary quasi orthogonal code vector is applied at a receiver to decode the transmitted message signal.

The transmission method also includes forming a vector matrix using a series of cyclic shifts of a sequence having a characteristic polynomial. The characteristic polynomial of the sequence is a primitive polynomial having a degree r. The method further includes permuting the vector matrix to form an orthogonal code to thereby provide a permutation matrix. The permutation matrix is applied to a message signal to provide an encoded message signal and the encoded message signal is transmitted in the communications system. An inverse process is applied at a receiver to decode the transmitted message signal.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE INVENTION

In the signal transmission method of the present invention, masks m are constructed and applied to orthogonal code vectors in order to provide quasi orthogonal code vectors, wherein the masks are four phase or quaternary phase shift keying (QSPK) masks. Thus the masks m have an alphabet of four elements, $\{\pm 1, \pm j\}$, rather than two elements, where $j=\sqrt{-1}$ is the imaginary root of unity. It will be understood that the signal transmission method of the present invention can require two masks m when transmitting a message signal. One of the two masks can be used for the in phase (I) channel and one can be used for the out of phase (Q) channel.

In order to practice the transmission method of the present invention, the new masks m can be generated using linear feedback shift registers (LFSR). A $2^k$-ary LFSR sequence s[t] is a sequence having symbols $\{0, 1, \ldots, 2^k-1\}$ where k is limited to the value 1 in the binary case and two in the quaternary case. The sequence satisfies a linear recurrence relationship of the form:

$$\sum_{i=0}^{r} c_i s(t+i) = 0 (\bmod 2^k), \forall t > 0$$

where $r \geq 1$ is the degree of the recursion. The coefficients $c_i$ belong to the set $\{0, 1, \ldots, 2^k-1\}$ and $c_r \neq 0$. This type of sequence s[t] has a characteristic polynomial:

$$c(x) = \sum_{i=0}^{r} c_i x^i$$

When k=1, the sequence s[t] is periodic with a period that is less than or equal to $2^r-1$. If the period of the sequence s[t] reaches the maximum value $2^r-1$, the characteristic polynomial of s[t] is defined as a primitive polynomial and the sequence s[t] is an m-sequence. Sequences of this type are taught in S. W. Golomb, "Shift Register Sequences," Holden Day, San Francisco, Calif., 1967.

A code matrix C' includes one period of an m-sequence and one period of each of its cyclic shifts. Thus, the size of the code matrix C' is $2^r-1$. The code matrix C' can be extended by appending a zero bit to each code word in matrix C'. The zero is appended at the same bit location of each code word. The inclusion of an all zero vector in this manner forms the code matrix C from the code matrix C'. The code matrix C has a length $2^r$ and a size $2^r$. In one embodiment the code matrix C can be column wise and rowwise permuted to create the Walsh code $W_{b,2^r}$ of size $2^r$. However, it is sufficient to obtain permutation matrix P such that the set of row vectors of the matrix product CP are the same as the set of row vectors of $W_{b,2^r}$.

Figure 1:
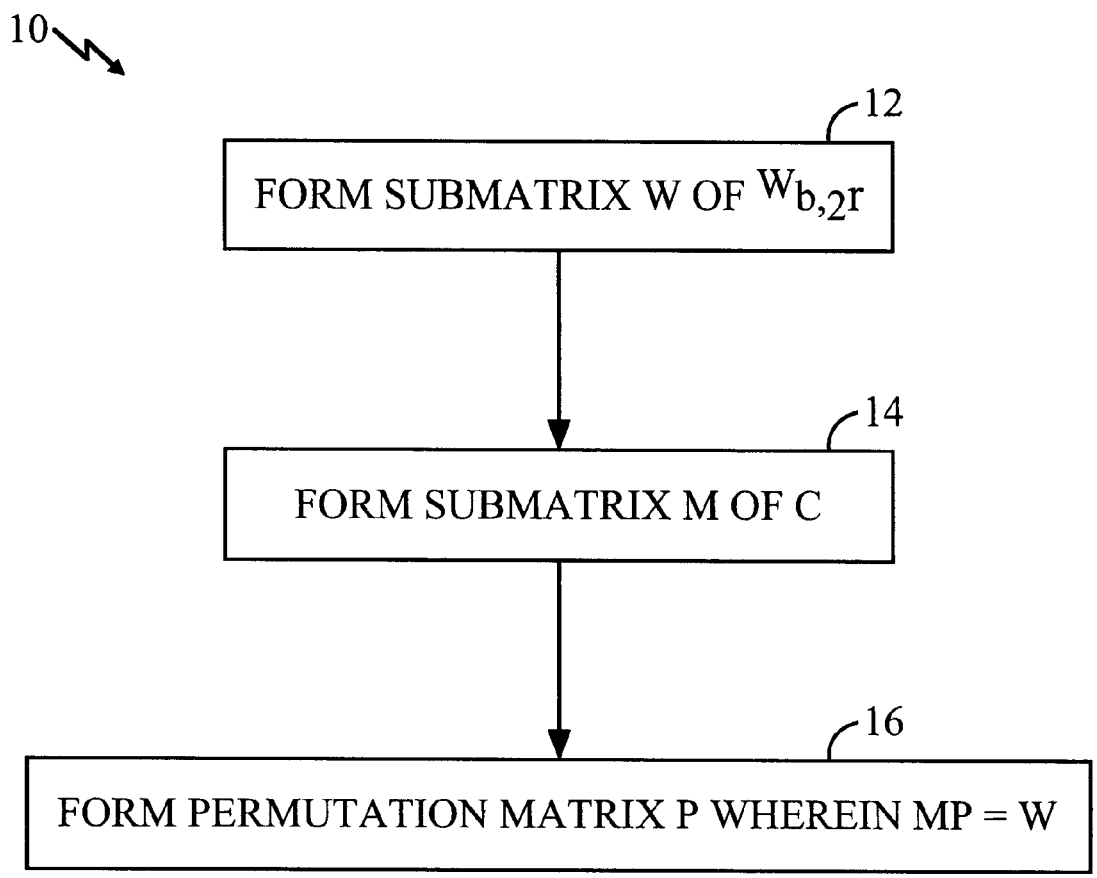
FIG. 1 shows a block diagram representation of a permutation matrix algorithm suitable for use in the method of the present invention.

Referring now to FIG. 1, there is shown permutation matrix algorithm 10 which is suitable for use in the present invention. In permutation matrix algorithm 10 a submatrix W of matrix $W_{b,2^r}$ is formed as shown in block 12. The submatrix W includes r rows having indices $1, 2, 4, \ldots, 2^{r-1}$. Note that the indexing of $W_{b,2^r}$ is zero based and ranges from 0 to $2^r-1$. Matrix W therefore has r rows and $2^r$ columns. Every column of matrix W is distinct from all of the other columns.

A submatrix M of code matrix C is then formed as shown in block 14 of permutation matrix algorithm 10. Submatrix M has r rows and $2^r$ columns. In order to form submatrix M an intermediate submatrix M' having r rows and $2^r-1$ columns is formed. Submatrix M' is formed by adding a column containing all zeros to submatrix M. The first row of submatrix M' can be any cyclic shift of the m-sequence used in constructing code C. The r-1 rows of submatrix M' following the first row are successive shifts by one time unit in each case beginning with the first row. Every column of submatrix M is distinct.

A permutation matrix P such that MP=W is then determined as set forth in block 16 of permutation matrix algorithm 10. Permutation matrix P is the required output of algorithm 10. Because submatrices M and W have the same set of distinct columns the determination of P in this manner is straightforward. In an alternate embodiment of the invention permutation matrix P can be determined using a matrix computation technique. It will be understood by those skilled in the art that the rows of the matrix CP are the same as the rows of $W_{b,2^r}$.

When k=2, and sequences therefore have a quaternary alphabet, a sequence known as Family A can be determined. The Family A sequence is taught, for example, in S. Boztas, P. V. Kumar, R, Hammons, "4-Phase Sequences with Near-Optimum Correlation Properties," IEEE Transactions on Information Theory, IT-38 No. 3 (May 1992), pp 1101–1113. In order to obtain a Family A sequence, let c(y) be a binary primitive polynomial of degree r. A polynomial g(x) having coefficients in the set $\{0, 1, 2, 3\}$ can be lifted from the polynomial c(x) as follows:

$$g(x^2) = (-1)^r c(x) c(-x) (\bmod 4)$$

Such a lift of the binary polynomial c(x) to the quaternary polynomial g(x) is a special case of the Hensel lift of polynomials. For example, see B, R, MacDonald, "Finite Rings with Identity," Marcel Dekker, Inc., New York, 1974. The LFSR sequence with the characteristic polynomial g(x) is defined to be a Family A sequence. The sequence has a period $2^r-1$.

Figure 2:
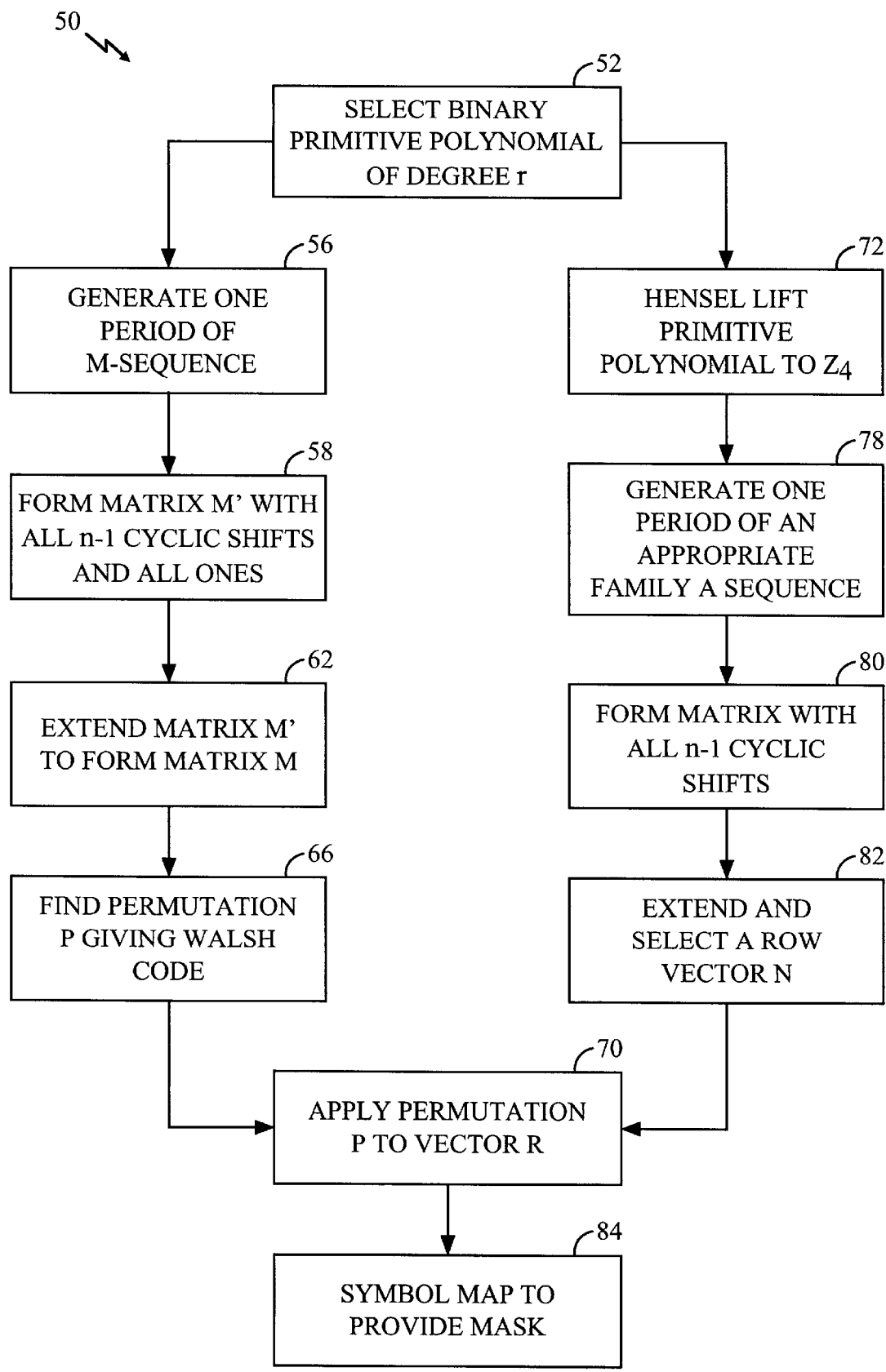
FIG. 2 shows a block diagram representation of the quasi orthogonal mask generation algorithm of the present invention.

Referring now to FIG. 2, there is shown quasi orthogonal mask generation algorithm 50. Quasi orthogonal mask generation algorithm 50 can be used to construct four-phase masks for forming quasi orthogonal vectors of length $2^r$. In mask generation algorithm 50 a binary primitive polynomial c(x) of degree r is provided as shown in block 52. Using primitive polynomial c(x) as its characteristic polynomial, a period of an m-sequence is constructed as shown in block 56.

Matrix M' having dimensions $(2^r-1) \times (2^r-1)$ is constructed as shown in block 58. The rows of matrix M' each contain a period of the m-sequence of block 56 along with all of its cyclic shifts. Matrix M' is then extended to form matrix M as shown in block 62. The extension of matrix M' is performed by adding an all zero column and an all zero row to matrix M'. The dimensions of matrix M are therefore $2^r \times 2^r$. For convenience, the first column of matrix M can be the all zero column. As set forth in block 66 a permutation P is found which column permutes the matrix M to contain the same row vectors as those contained in $W_{b,2^r}$. The permutation matrix method taught hereinabove, or any other method known to those skilled in the art, can be used to perform the operations of block 66.

A Hensel lift is then performed on the primitive polynomial c(x) obtained in block 52 of mask generation algorithm 50 to provide the polynomial g(x) as described hereinabove. The Hensel lift operation is shown in block 72. One period of the Family A sequences with the polynomial g(x) as its characteristic polynomial is generated as shown in block 78. A sequence of the Family A sequences is selected. The selected sequence can be any one of the Family A sequences having at least one symbol equal to one or three.

A vector N' of length $(2^r-1)$ is constructed. The vector N' consists of a period of the Family A sequence selected according to block 78. A vector N of length $2^r$ is formed in step 82 by appending a zero bit at the first bit location to vector N'. The vector N is then column permuted using the permute P found in block 66. The resulting permuted code word can be used (step 84) as a masking function for generating quasi orthogonal vectors according to the method of the present invention. The quasi orthogonal vectors generated in this manner can be used with symbol mapping to (+1,−1, +j, −j). A total of 127 masks can be generated in this manner for a length 128 Walsh code. Two of the masks generated according to quasi orthogonal mask algorithm 50 are set forth in Table I below.

TABLE I

[1j1j1j1j1j1j1j1j1j1j1j1j−1−j−1−j−1−j−1−j1j1j−1−j−1−j1j1j−1−j−
1−j1j1j−1−j−1−j−1−j−1−j1j1j1j−1−j1j−1−j1j−1−j1j−1−j1j−1−j1j−1−
j−1−j1j−1−j1j1j−1−j−1−j1j1j−1−j−1−j1j1j−1−j−1−j1j−1−j1j1j−1−j]
[1j1j1j1j−1−j−1−j1j1j1j−1−j1j−1−j1j−1−j−1−j1j1−j1−j−1j−1j−1j−
1j−1j1−1j−j1−j1−j−1j1−j−1j−j1−j1j−1j−1j−1j1−j−1j−1j−1j−1j1−
j1−j−1j1j−1j1−j−1j−j−1−j1j−1j1−j−1j1j1−j−1−j−1j1j1j1j1]

Figure 3:
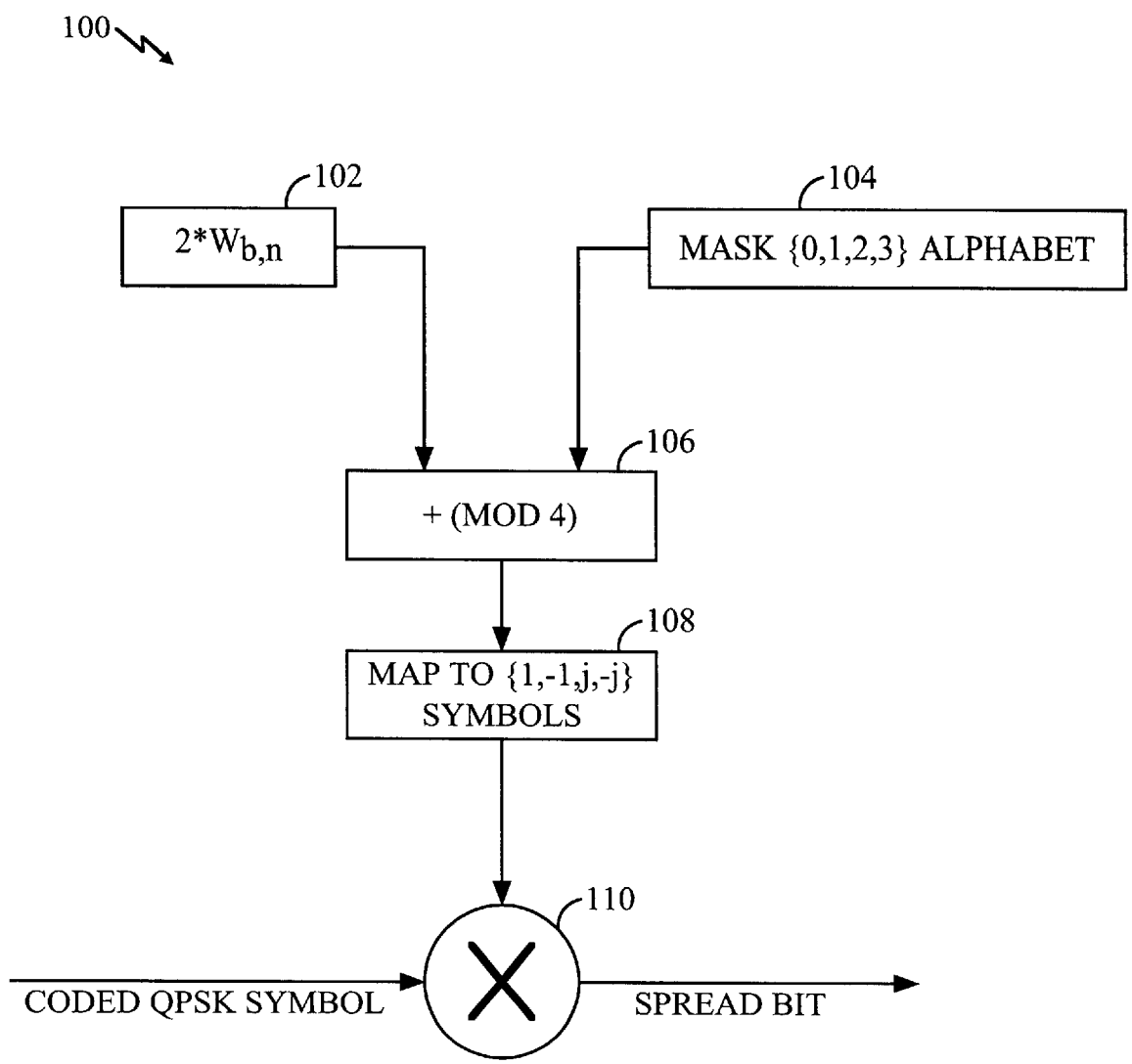
FIG. 3 shows a block diagram representation of a method for mapping vectors that is suitable for use in the method of the present invention.

Referring now to FIG. 3, there is shown vector mapping function 100. As shown in vector mapping function 100 a quasi orthogonal vector mask can be represented equivalently with symbols from the {0, 1, 2, 3} alphabet or with symbols from {+1, −1, +j, −j} alphabet of Table I using the mapping:

0→1

1→j

2→−1

3→−j

As shown in blocks 102, 104, respectively, the (0/1) Walsh code vectors (multiplied by two) and the masks in the (0, 1, 2, 3) alphabet can be added using modulo 4 adder 106. The result of the addition is mapped into a {+1, −1, +j, −j} alphabet as shown in mapping block 108. The output of mapping block 108 can be applied to coded QPSK symbols by mixer 110 to provide a coded message signal output for transmission.

The correlation between any code vector in the Walsh code and any code vector obtained by applying the masks of Table I to the Walsh code vectors is {±1/16±j/16}.

Thus, the maximum absolute correlation is $$\frac{1}{8}\sqrt{2} = \frac{1}{\sqrt{n}}$$

and the theoretical lower bound on the correlation set forth hereinabove is met with equality. Furthermore, the method of quasi orthogonal mask generation algorithm 50 can be generalized to all powers of two to yield the optimal quasi orthogonal vectors for each power of two. Table II sets fourth the correlations and the number of masks provided according to the method of the present invention for several powers of two.

TABLE II

| Length | Maximum Absolute Correlation With Walsh code | Correlation Spectrum | Number Of Available Masks |
|---|---|---|---|
| 32 | 0.177 | $\{\pm\frac{1}{8},\pm\frac{j}{8}\}$ | 31 |
| 64 | 0.125 | $\{\pm\frac{1}{8},\pm\frac{j}{8}\}$ | 63 |
| 128 | 0.0833 | $\{\pm\frac{1}{16},\pm\frac{j}{16}\}$ | 127 |
| 256 | 0.0625 | $\{\pm\frac{1}{16},\pm\frac{j}{16}\}$ | 255 |
| 512 | 0.0442 | $\{\pm\frac{1}{32},\pm\frac{j}{32}\}$ | 511 |

In addition to the four phase case described herein, the present invention provides for the construction and transmission of binary quasi orthogonal code vectors using masking functions obtained using the present invention. When the length of a masking function in the binary case is an even power of two the method of the present invention provides quasi orthogonal functions having the optimal correlation between every pair of quasi orthogonal sets. When the length of the masking function is an odd power of two, the correlation between any pair of sets is as least as good as the known results using binary alphabets.

It will be recalled that in a $2^k$-ary linear feedback shift register s[t] is a sequence with symbols $\{0, 1, \ldots, 2^k-1\}$ that satisfies the relationship set forth hereinabove. Such a sequence s[t] has a characteristic polynomial c(x) that is defined as also set forth hereinabove. The method for forming binary quasi orthogonal vectors is restricted to the case corresponding to k=1.

When k=1 the sequence s[t] is periodic with a period less than or equal to $2^r-1$. If the period of the sequence s[t] reaches the maximum value $2^r-1$ the characteristic polynomial of s[t] can be defined as a binary primitive polynomial. In this case the sequence s[t] is defined as an m-sequence.

A code matrix C' can be defined to consist of one period of an m-sequence m1 with characteristic polynomial c(x) and one period of all of the cyclic shifts of the m-sequence m1. Thus the size of the code matrix C' is $2^r-1$. The code matrix C' can be extended by appending a zero bit to each code word within matrix C' at the same bit location of each code word. In the preferred embodiment, the appended zero bits can be placed at the first bit location of each code word within matrix C.

When the all zeros vector is applied to code matrix C' in this manner, code matrix C is formed. Code matrix C has a size of 2r×2r. Code matrix C can be column wise and row wise permuted to form the Walsh code $W_{b,2^r}$ and a record of the permutation operations required to form $W_{b,2^r}$ can be made. However, in the method of the present invention the permutation matrix P can be applied to form the dot product CP and obtain the same vectors as the set of row vectors of $W_{b,2^r}$.

Figure 4:
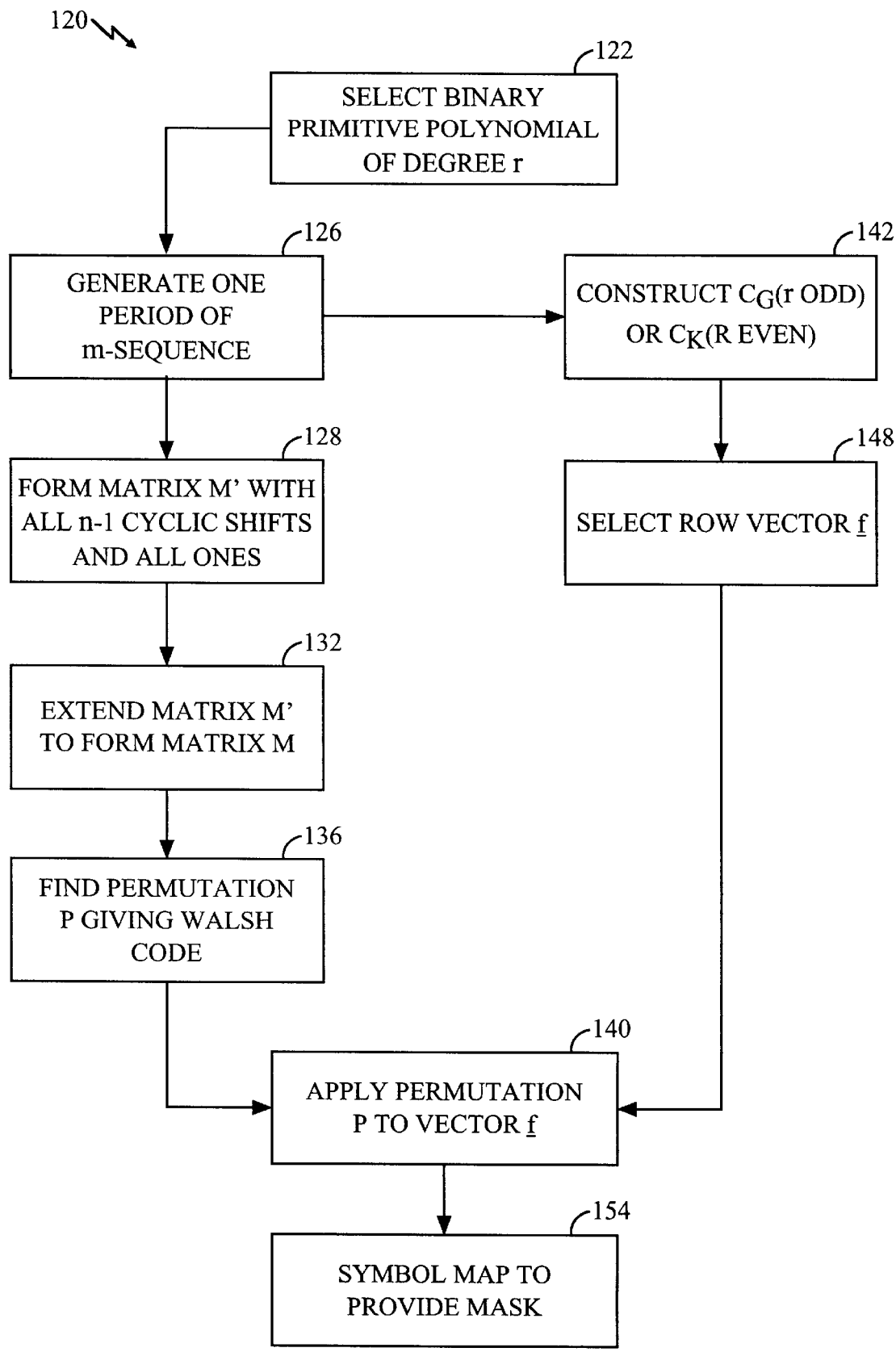
FIG. 4 is a block diagram representation of the quasi orthogonal mask generation algorithm of the present invention in a form suitable for use in the binary case.

Referring now to FIG. 4, there is shown binary quasi orthogonal mask generation algorithm 120. Binary quasi orthogonal mask generation algorithm 120 can be used to construct two phase masks for forming quasi orthogonal vectors of length $2^r$. In mask generation algorithm 120 a binary primitive polynomial c(x) of degree r is provided as shown in block 122. Using primitive polynomial c(x) as its characteristic polynomial, a period of an m-sequence is constructed as shown in block 126.

Matrix M' having dimensions $(2^r-1) \times (2^r-1)$ is constructed as shown in block 128. The rows of matrix M' each contain a period of the m-sequence of block 126 along with all of the cyclic shifts of the m-sequence. Matrix M' is then extended to form matrix M as shown in block 132. The extension of matrix M' is performed by adding an all zero column and an all zero row to the matrix M'. The dimensions of matrix M are therefore $2^r \times 2^r$. In the preferred embodiment, the first column of the matrix M can be the all zero column. As set forth in block 136 a permutation P is found that column permutes the matrix M to contain the same row vectors as those contained in $W_{b,2^r}$ and a record of the required permutation operations can be made.

The permutation matrix method taught hereinabove, or any other method known to those skilled in the art, can be used to perform the operations of block 136. A code matrix $C_G$ or a code matrix $C_K$ is then formed as shown in block 142 of binary quasi orthogonal mask generation algorithm 120. The code matrix $C_G$ is formed in cases where the degree of the primitive polynomial r is odd and the code matrix $C_K$ is formed when r is even.

Figure 5:
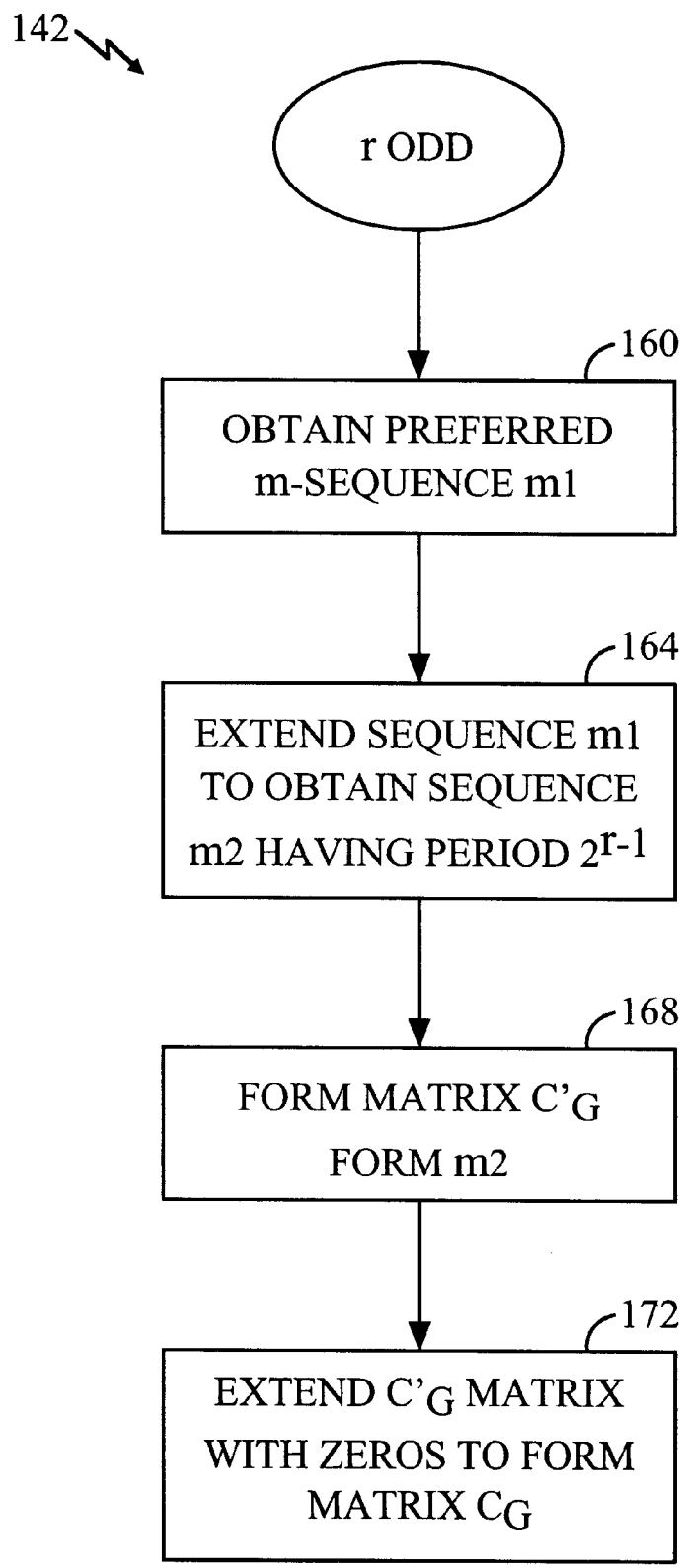
FIG. 5 is a more detailed representation of a matrix generation step of one embodiment of the mask generation algorithm of FIG. 4.

Referring now to FIG. 5, there is shown a more detailed representation of block 142 in the case where r is odd. As shown in block 160 of FIG. 5, a preferred m-sequence m1 is obtained. A sequence m2 that forms a preferred pair with the m-sequence m1 is then obtained. The sequence m2 can have a period $2^r-1$ and can be obtained by extending the sequence m1. The extending of the sequence ml is shown in block 164.

The code matrix $C'_G$ is then formed from the sequence m2 as shown in block 168. It is a matrix having one period of each of the m-sequence m2 and all of its distinct cyclic shifts. The number of rows in matrix $C'_G$ is $2^r-1$ and the number of columns is $2^r-1$. The code matrix $C_G$ is formed from the code matrix $C'_G$ by extending the matrix $C'_G$ as shown in block 172. The extension of the matrix $C'_G$ can be performed by appending a zero bit at the same bit location of each code word in the matrix $C'_G$. The bit location used for appending the zero can be the first bit location. The number of rows in code matrix $C_G$ is $2^r-1$ and the number of columns is $2^r$.

Figure 6:
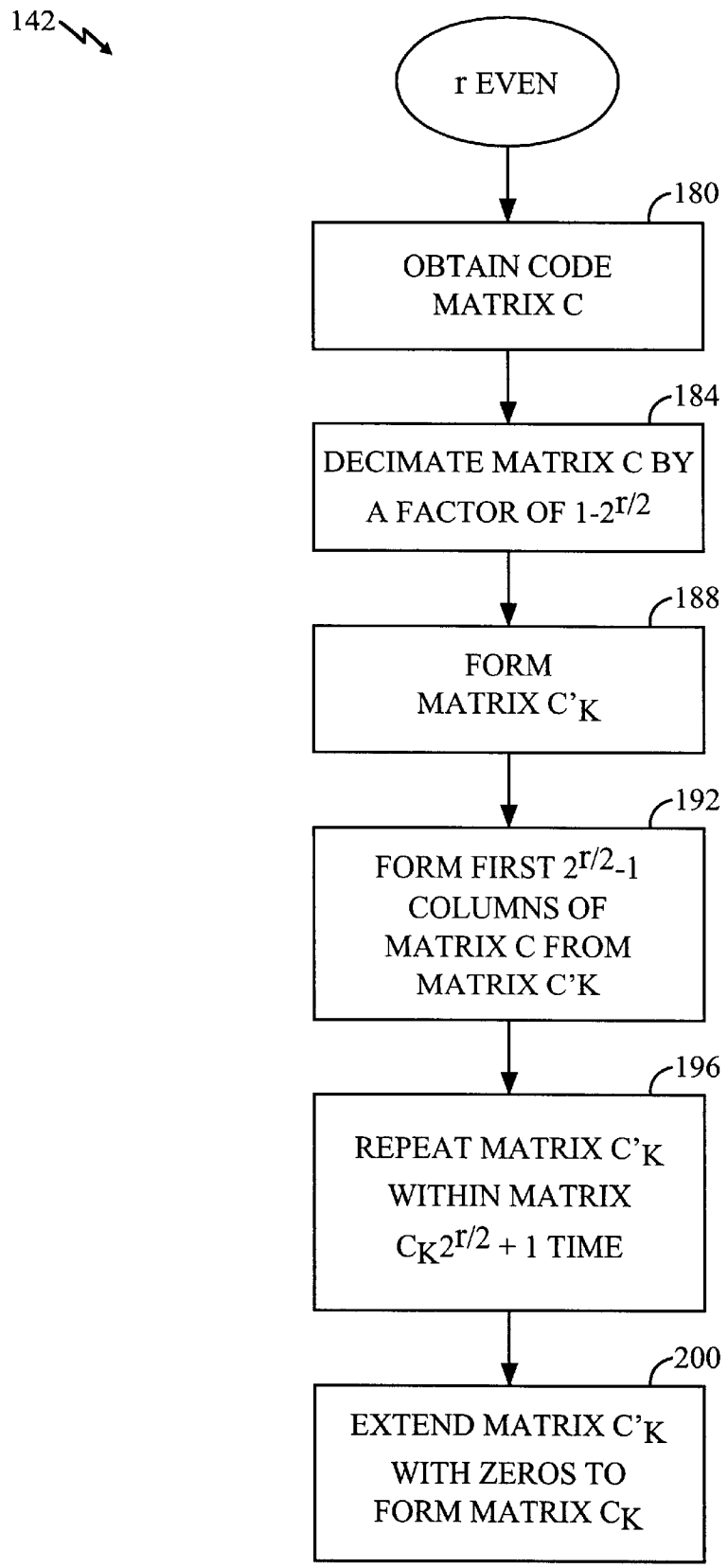
FIG. 6 is a more detailed representation of the matrix generation step in another embodiment of the mask generation algorithm of FIG. 4.

Referring now to FIG. 6, there is shown a more detailed representation of block 142 of binary quasi orthogonal mask generation algorithm 120 in the case wherein the degree of the primitive polynomial r is even. In block 180 of FIG. 6 a code matrix C is obtained as previously described. The code matrix C is then decimated by a factor of $1-2^{r/2}$. The sequence m3 is the m-sequence obtained from the m-sequence m1 by decimating the sequence m1 by a factor $1+2^{r/2}$. The sequence m3 has a period of $2^{r/2}-1$.

In the decimation process of block 184 predetermined columns of C are selected and the remaining columns are not selected as follows. If $C_i$ is the with column of code matrix C and $\underline{C}_K,i$ is the with column of code matrix $\underline{C}$ formed by decimating the code matrix C then:

$C_{k,1} = C_1$ $C_{k,2} = C_{1+2^{r/2}}$ $C_{k,3} = C_{2(1+2^{r/2})}$ $C_{k,i} = C_{(i-1)(1+2^{r/2})}$

A code matrix $C_K'$ is formed as shown in block 188. The formation of the matrix $C_K'$ is begun in step 192 by inserting $2^{r/2}-1$ periods each of m3 sequence and all its distinct cyclic shifts. This forms the first $2^{r/2}-1$ columns of code matrix $C_K'$. The first $2^{r/2}-1$ columns are then repeated $2^{r/2}+1$ times as shown in block 196. A code matrix $C_K$ can be obtained by appending a zero bit at the first location of each code word within the matrix $C_K'$ as shown in block 200. The size of the code matrix $C_K$ can be $2^{r/2}-1$.

Thus, using the method of the present invention it is possible to construct quasi orthogonal functions for all powers of two in the binary case wherein k=1. Additionally, the method of the present invention can provide many more masking functions than were available in the prior art because of the size of the matrices. The number of masking functions obtained using binary quasi orthogonal mask generation algorithm 120 for some exemplary values of length n are set forth in Table III along with the maximum absolute correlation with the Walsh code and the correlation spectrum.

TABLE III

| Length | Maximum Absolute Correlation With Walsh code | Correlation Spectrum | Number Of Available Masks |
|---|---|---|---|
| 32 | 0.25 | $\{0, \pm \frac{1}{4}\}$ | 31 |
| 64 | 0.125 | $\{\pm \frac{1}{8}\}$ | 7 |
| 128 | 0.125 | $\{0, \pm \frac{1}{8}\}$ | 127 |
| 256 | 0.0625 | $\{\pm \frac{1}{16}\}$ | 15 |
| 512 | 0.0625 | $\{0, \pm \frac{1}{16}\}$ | 511 |

Returning now to FIG. 4, execution of binary mask generation algorithm 120 proceeds from block 142, which is described in more detail in FIGS. 5 and 6. In block 148 of mask generation algorithm 120 a row vector $\underline{f}$ of either code matrix $C_G$ or code matrix $C_K$ is selected. The permutation P determined herein is then applied to the row vector $\underline{f}$ as shown in block 140. As set forth in block 154, and previously described herein, a mask can be provided according to the permutation. The mask can be applied to orthogonal vectors to provide quasi orthogonal vectors which can be used as described above to provide a coded message signal output for transmission.

Figure 7:
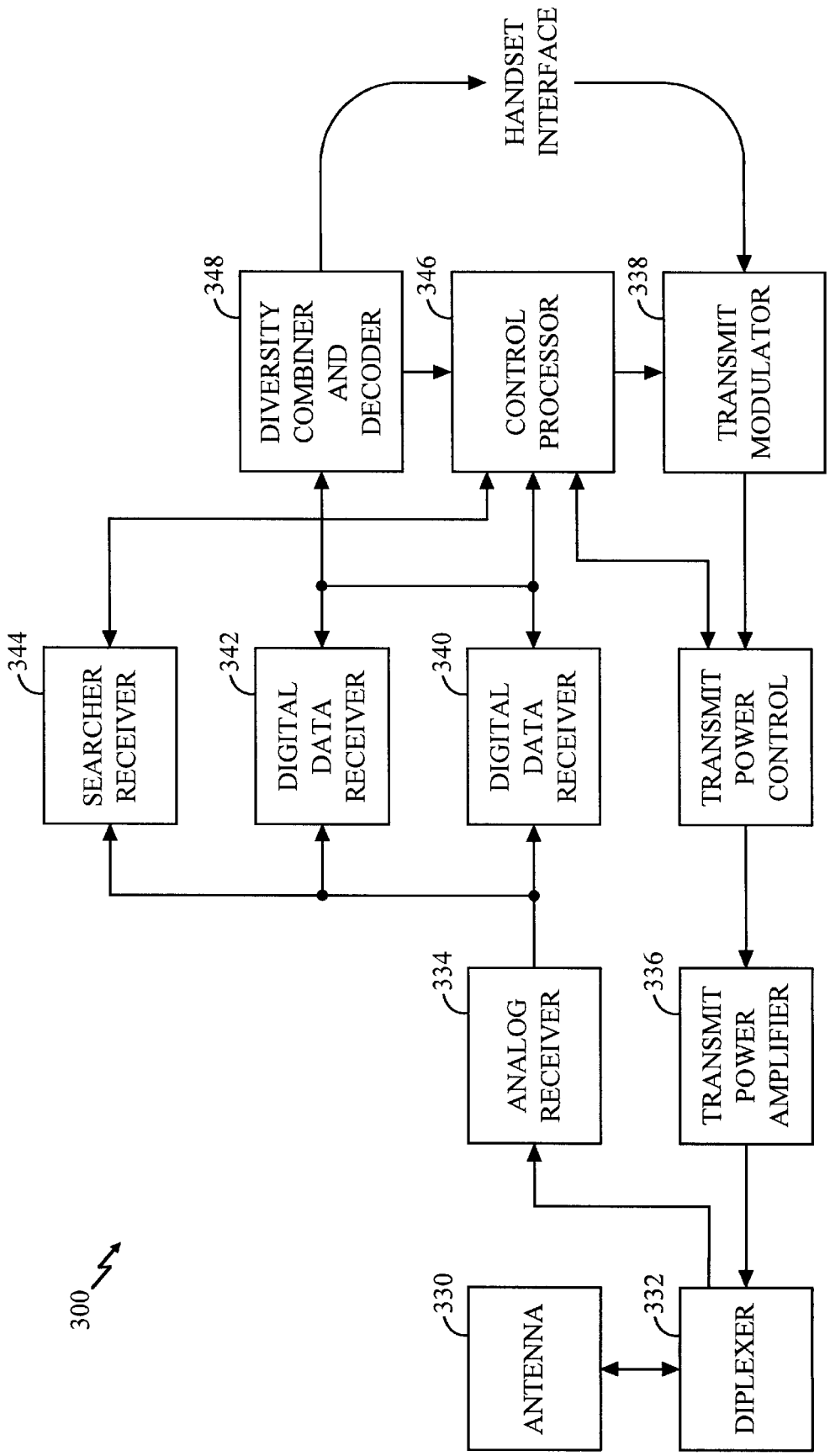
FIG. 7 is a block diagram of the components of an exemplary CDMA mobile station used for implementing the message encoding system of the present invention.

Referring now to FIG. 7, there is a block diagram showing the components of an exemplary code division multiple access (CDMA) mobile station 300 used for implementing the message encoding and decoding system of the present invention. The mobile station includes an antenna system 330, which is coupled through diplexer 332 to analog receiver 334 and transmit power amplifier 336. Antenna system 330 and diplexer 332 are of standard design and permit simultaneous reception and transmission through one or more antennas. Antenna system 330 optionally includes one antenna for voice traffic, and a separate antenna for receiving GPS signals. Antenna system 330 collects signals transmitted to the mobile station from one or more base stations and the GPS system, and provides the signals though diplexer 332 to analog receiver 334. Receiver 334 is also provided with an analog to digital converter (not shown). Receiver 334 receives RF signals from diplexer 332, amplifies and frequency downconverts the signals, and provides a digitized output signal to digital data receivers 340, 342 and to search receiver 344. It will be understood that, although in the embodiment in FIG. 7 only two digital data receivers are shown, a low performance mobile station might have only a single digital data receiver while higher performance units will have two or more digital data receivers to permit diversity reception. The outputs of receivers 340 and 342 are provided to diversity and combiner circuitry 348 which time adjusts the two streams of data received from the receivers 340 and 342, adds the streams together and decodes the result. Details concerning the operation of the digital data receivers 340, 342, the search receiver 344, and the diversity combiner and decoder circuitry 348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 348 to control processor 346. The control processor 346 includes software that decodes the output of decoder 348 in accordance with quasi orthogonal vectors generated in accordance with the present invention. More particularly, the control processor 346 decodes messages that have been encoded using the quasi orthogonal vectors of the present invention and sent to mobile station 300 via a transmitter site such as base station 400 described below. The control processor 346 further includes software for encoding messages using such quasi orthogonal vectors and transmitting such encoded messages to a further station via antenna 330. In one embodiment, the mobile station 300 can store the quasi orthogonal vectors used for encoding and decoding in memory to reduce processing requirements during transmission and reception of the message signals. Alternatively, the quasi orthogonal vectors can be generated in real time (i.e., during the message encoding and decoding processes) in mobile station 300 in order to, for example, conserve available memory space.

Figure 8:
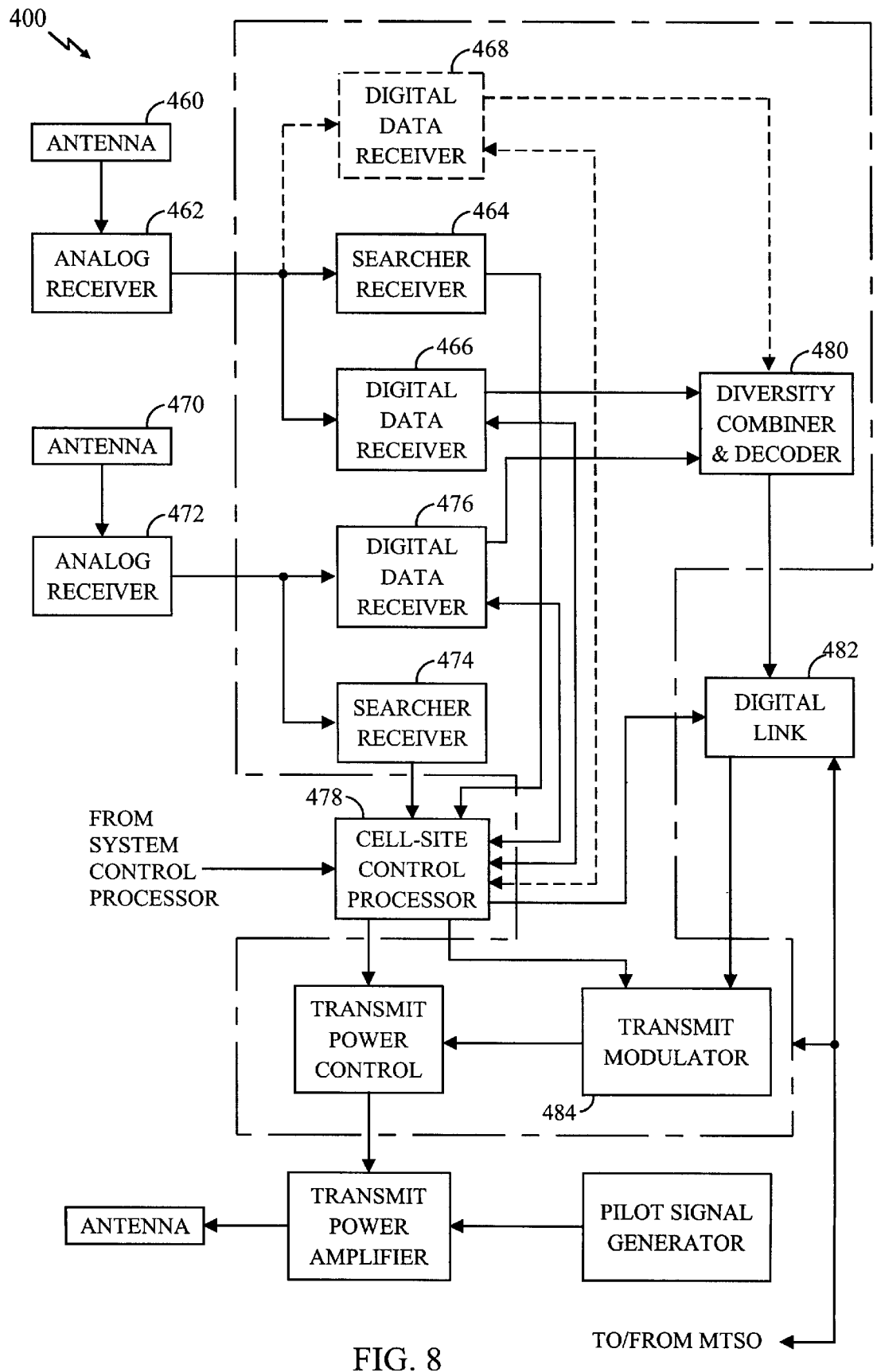
FIG. 8 is a block diagram of the components of an exemplary CDMA base station used for implementing the message encoding system of the present invention.

Referring now to FIG. 8, there is shown a block diagram of the components of an exemplary CDMA base station 400 used for implementing the message encoding system of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 8, the first receiver system is comprised of antenna 460, analog receiver 462, searcher receiver 464 and digital data receivers 466 and 468. The second receiver system includes antenna 470, analog receiver 472, searcher receiver 474 and digital data receiver 476. Cell-site control processor 478 is used for signal processing and control.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474 and digital data receiver 476) processes the received signals in a manner similar to the first receiver system. The outputs of the digital data receivers 466, 476 are provided to diversity combiner and decoder circuitry 480, which processes the signals in accordance with a decoding algorithm. Details concerning the operation of the first and second receiver systems and the diversity combiner and decoder 480 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 484 under the control of processor 478. A message encoding system such as that shown in connection with FIGS. 1–6 is preferably implemented in software in cell-site control processor 478. Transmit modulator 484 modulates the data for transmission to the intended recipient mobile station. The control processor 478 also includes software that decodes the output of decoder 480 in accordance with quasi orthogonal vectors generated in accordance with the present invention. More particularly, the control processor 478 decodes messages that have been encoded using the quasi orthogonal vectors of the present invention and sent to base station 400 via a transmitter site such as mobile station 300 described above. In one embodiment, the base station 400 can store the quasi orthogonal vectors used for encoding and decoding in memory to reduce processing requirements during transmission and reception of the message signals. Alternatively, the quasi orthogonal vectors can be generated in real time (i.e., during the message encoding and decoding processes) in base station 400 in order to, for example, conserve available memory space.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, it will be understood that the permutation method set forth herein is not limited to use in forming two phase and four phase quasi orthogonal vectors. Rather, it can be used as part of forming any kind of encoded message signal for any kind of signal within a communications system.

What is claimed is:

1. A transmission method in a communications system having at least one orthogonal code vector for transmitting message signals, comprising the steps of:
   (a) forming a first vector matrix using a first series of cyclic shifts of a sequence having a characteristic polynomial wherein the characteristic polynomial of the sequence is a primitive polynomial with a degree r;
   (b) forming a second vector matrix using a second series of cyclic shifts in accordance with whether r is odd or even;
   (c) permuting the first vector matrix to provide an orthogonal code;
   (d) determining the permuting operations of step (c);
   (e) applying the determined permuting operations to the second matrix to provide a binary quasi orthogonal code vector; and
   (f) applying the binary quasi orthogonal code vector to the message signal to provide an encoded message signal for transmitting the encoded message signal within the communications system.

2. The transmission method of claim 1, wherein r is odd and the sequence is an m-sequence, comprising the step of obtaining a preferred m-sequence m1.

3. The transmission method of claim 2, comprising the step of obtaining a sequence m2 that forms a preferred pair with the m-sequence m1.

4. The transmission method of claim 3, wherein the sequence m2 has a period of $2^{r-1}$.

5. The transmission method of claim 3, wherein the step of obtaining the sequence m2 comprises the step of extending sequence m1.

6. The transmission method of claim 3, wherein the step of obtaining the sequence m2 comprises the step of extending the sequence m1.

7. The transmission method of claim 1, wherein r is odd and matrix $C_G$ is obtained.

8. The transmission method of claim 4, wherein r is even comprising the step of forming a matrix $C'_K$ including the sequence m2.

9. The transmission method of claim 8, comprising the step of including a plurality of repetitions of the sequence m2 within the matrix $C'_K$.

10. The transmission method of claim 9, comprising the step of extending the matrix $C'_K$ to form the second vector matrix.

11. The transmission method of claim 2, wherein the length n of the orthogonal code vector is equal to $2^r$ and step (a) comprises n−1 cyclic shifts.

12. The transmission method of claim 11, comprising the step of extending the first matrix prior to permuting the first matrix.

13. The transmission method of claim 1, comprising the further steps of permuting the second vector matrix provide a mask; and applying the mask to an orthogonal code vector to provide the binary quasi orthogonal vector.

14. The transmission method of claim 13, comprising the step of applying the mask to a plurality of orthogonal vectors to provide a plurality of binary quasi orthogonal vectors.

15. The transmission method of claim 1, wherein the orthogonal code vector has a length n and the absolute value of the correlation between the orthogonal vector and the quasi orthogonal vector is $1/\sqrt{n}$ for n any power of two.

16. A communications system having at least one orthogonal code vector for transmitting message signals, comprising:

(a) a first vector matrix formed using a first series of cyclic shifts of a sequence having a characteristic polynomial wherein the characteristic polynomial of the sequence is a primitive polynomial with degree r;

(b) a second vector matrix formed using a second series of cyclic shifts in accordance with whether r is odd or even;

(c) an orthogonal code formed by permuting the first vector matrix, (d) a record formed by determining the permuting operations;

(e) a binary quasi orthogonal code vector formed by applying the determined permuting operations to the second matrix; and (f) an encoded message signal for transmitting the encoded message signal formed by applying the binary quasi orthogonal code vector to a message signal.

17. A communications system having at least one orthogonal code vector for transmitting message signals, comprising the steps of:

(a) means for forming a first vector matrix using a first series of cyclic shifts of a sequence having a characteristic polynomial wherein the characteristic polynomial of the sequence is a primitive polynomial with degree r;

(b) means for forming a second vector matrix using a second series of cyclic shifts in accordance with whether r is odd or even;

(c) means for permuting the first vector matrix to provide an orthogonal code;

(d) means for determining the permuting operations;

(e) means for applying the determined permuting operations of the first vector matrix to the second matrix to provide a binary quasi orthogonal code vector; and (f) means for applying the binary quasi orthogonal code vector to the message signal to provide an encoded message signal for transmitting the encoded message signal within the communications system.

18. A method in a communications for decoding a message signal encoded using at least one orthogonal code vector, comprising the steps of:

(a) forming a first vector matrix using a first series of cyclic shifts of a sequence having a characteristic polynomial wherein the characteristic polynomial of the sequence is a primitive polynomial with a degree r;

(b) forming a second vector matrix using a second series of cyclic shifts in accordance with whether r is odd or even;

(c) permuting the first vector matrix to provide an orthogonal code;

(d) determining the permuting operations of step (c);

(e) applying the determined permuting operations to the second matrix to provide a binary quasi orthogonal code vector; and (f) applying the binary quasi orthogonal code vector to an encoded message signal to provide a decoded message signal.

19. A communications system having at least one orthogonal code vector for decoding message signals, comprising:

(a) a first vector matrix formed using a first series of cyclic shifts of a sequence having a characteristic polynomial wherein the characteristic polynomial of the sequence is a primitive polynomial with degree r;

(b) a second vector matrix formed using a second series of cyclic shifts in accordance with whether r is odd or even;

(c) an orthogonal code formed by permuting the first vector matrix;

(d) a record formed by determining the permuting operations;

(e) a binary quasi orthogonal code vector formed by applying the determined permuting operations to the second matrix; and (f) a decoded message signal formed by applying the binary quasi orthogonal code vector to an encoded message signal.

20. A communications system having at least one orthogonal code vector for decoding message signals, comprising the steps of:

(a) means for forming a first vector matrix using a first series of cyclic shifts of a sequence having a characteristic polynomial wherein the characteristic polynomial of the sequence is a primitive polynomial with degree r;

(b) means for forming a second vector matrix using a second series of cyclic shifts in accordance with whether r is odd or even;

(c) means for permuting the first vector matrix to provide an orthogonal code;

(d) means for determining the permuting operations;

(e) means for applying the determined permuting operations of the first vector matrix to the second matrix to provide a binary quasi orthogonal code vector; and (f) means for applying the binary quasi orthogonal code vector to an encoded message signal to form a decoded message signal.

* * * * *